UNITED STATES PATENT OFFICE.

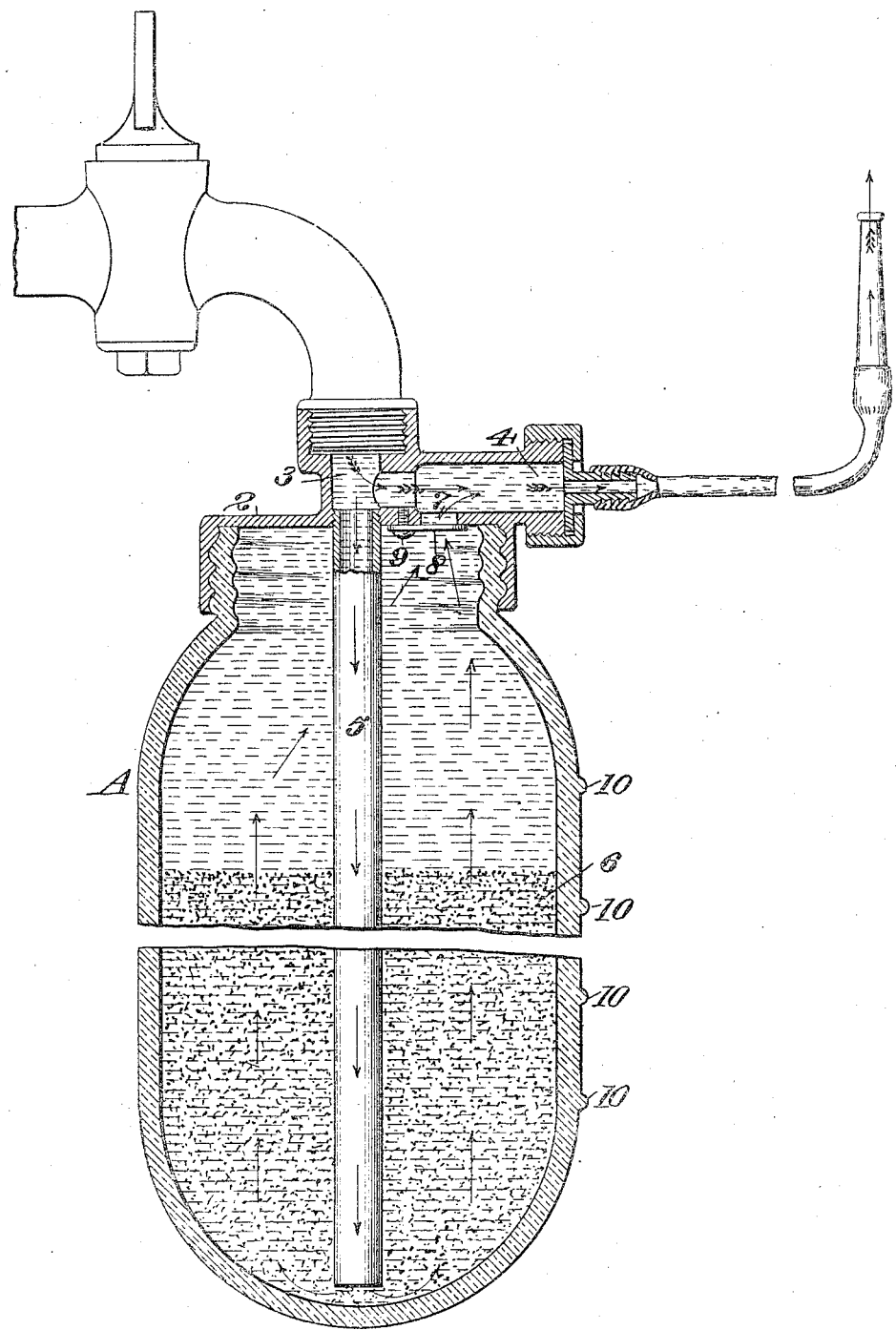

JOHN W. WHITE, JR., OF OAKLAND, CALIFORNIA.

DISTRIBUTER FOR FERTILIZERS, DISINFECTANTS, AND THE LIKE.

1,142,292.  Specification of Letters Patent.  Patented June 8, 1915.

Application filed April 13, 1914. Serial No. 831,482.

*To all whom it may concern:*

Be it known that I, JOHN W. WHITE, Jr., a citizen of the United States, residing at Oakland, in the county of Alameda and State of California, have invented new and useful Improvements in Distributers for Fertilizers, Disinfectants, and the like, of which the following is a specification.

This invention relates to an apparatus for dissolving and diffusing fertilizer disinfectants and the like.

The object of the present invention is to provide a simple, practical apparatus which may be attached to a faucet or to a hose, or may be interposed in a line of hose or other conduit, and so constructed and arranged that when charged with the fertilizer disinfectant, or the substance to be distributed, it will be apparent to the observer at what rate the distribution is taking place so as to be sure the proper strength of solution is delivered.

It will be seen that the present invention is particularly applicable to distribution of disinfectants and germicides such as Paris green, and fertilizing compounds such as nitrate of soda, potash, etc., and other such compounds as are of great strength, and if too great a quantity is distributed will be ruinous to plant life.

The invention consists of the parts and the combination and construction of parts as hereinafter more fully described and claimed, having reference to the accompanying drawings, in which—

The figure is a vertical section of the invention showing its practical application in use.

In carrying out the invention I employ a suitable container as A, made of glass in whole, so as to disclose at all times the contents and show to the operator the nature of the solution being distributed. This container is provided with a cap 2 preferably of metal and having an inlet 3, and an outlet 4 which intersect as shown. This cap 2 is made screw-threaded to be easily attached to the container A, and the inlet 3 is fashioned so it can be easily screwed to a faucet or on to a hose, and the outlet 4 is fashioned to take a section of hose or a distributing nozzle; the idea being that the distribution should take place under suitable pressure of any appropriate source.

5 is a tube connected with the inlet 3 and extending into the container A to allow a portion of the liquid to pass to the bottom of the container and freely circulate through the fertilizer or disinfectant compound 6 contained within the holder A; the liquid from the tube 5 rising through the solid contents and escaping through an orifice 7 in the cap into the outlet 4 to be mixed with the clear water which is by-passed direct from the inlet 3 into outlet 4. A suitable regulating device is employed to govern the amount of charged disinfectant, or fertilizing liquor passing from the container into the outlet 4. In the present instance, and for simplicity of construction, I employ a plate 8 which is adjustable by means of a screw 9 over the orifice 7 by which the amount of water passing through the fertilizing compound and into outlet 4 may be easily regulated.

This device is applicable for domestic use either within the house for disinfectant purposes, where it can be screwed on the faucet, or for use outside in fertilizing, where it can be attached to the faucet or hose and used for fertilizing and disinfectant purposes, as is illustrated in the drawing.

Its utility is further enhanced by providing the graduations 10 on the outside of the container so that the operator can more accurately observe the rate of distribution and thereby not kill the plant life by distributing too great a strength of solution upon a given area.

The importance in making the container transparent is emphasized by the fact that the rate of distribution is greater when the container is filled and decreases proportionally as the compound dissolves. By carefully observing the contents of the container a uniform distribution of the liquid over the area to be treated can be controlled within limits, so as to produce no deleterious effect on plant life; this regulation of strength can be effected by suitably manipulating the valve 8.

Having thus described my invention, what I claim and desire to secure by Letters Patent is—

In a fertilizer distributer the combination of a wide mouthed transparent receptacle having a screw top, said top provided with a vertically disposed inlet adapted for attachment to a hose bib by which entering water is directed downwardly, a pipe connected with the inlet and extending downwardly into the receptacle to a point adjacent the bottom thereof, said top having a lateral outlet arranged for connection with hose or the like, said outlet having a restricted port connection with the inlet above the tube and also having a port opening into the receptacle, a regulating valve for the last-named port, the latter and the port connecting the inlet and outlet together with the downwardly extending tube coöperating to equalize the strength of the solution delivered from the receptacle to the outlet, substantially as described.

In testimony whereof I have hereunto set my hand in the presence of two subscribing witnesses.

JOHN W. WHITE, Jr.

Witnesses:
 C. H. TALLANT,
 F. D. FAGAN.